Jan. 3, 1933.   J. A. WATSON, JR   1,893,259
REAR AXLE CONSTRUCTION FOR MOTOR VEHICLES
Filed Dec. 1, 1931
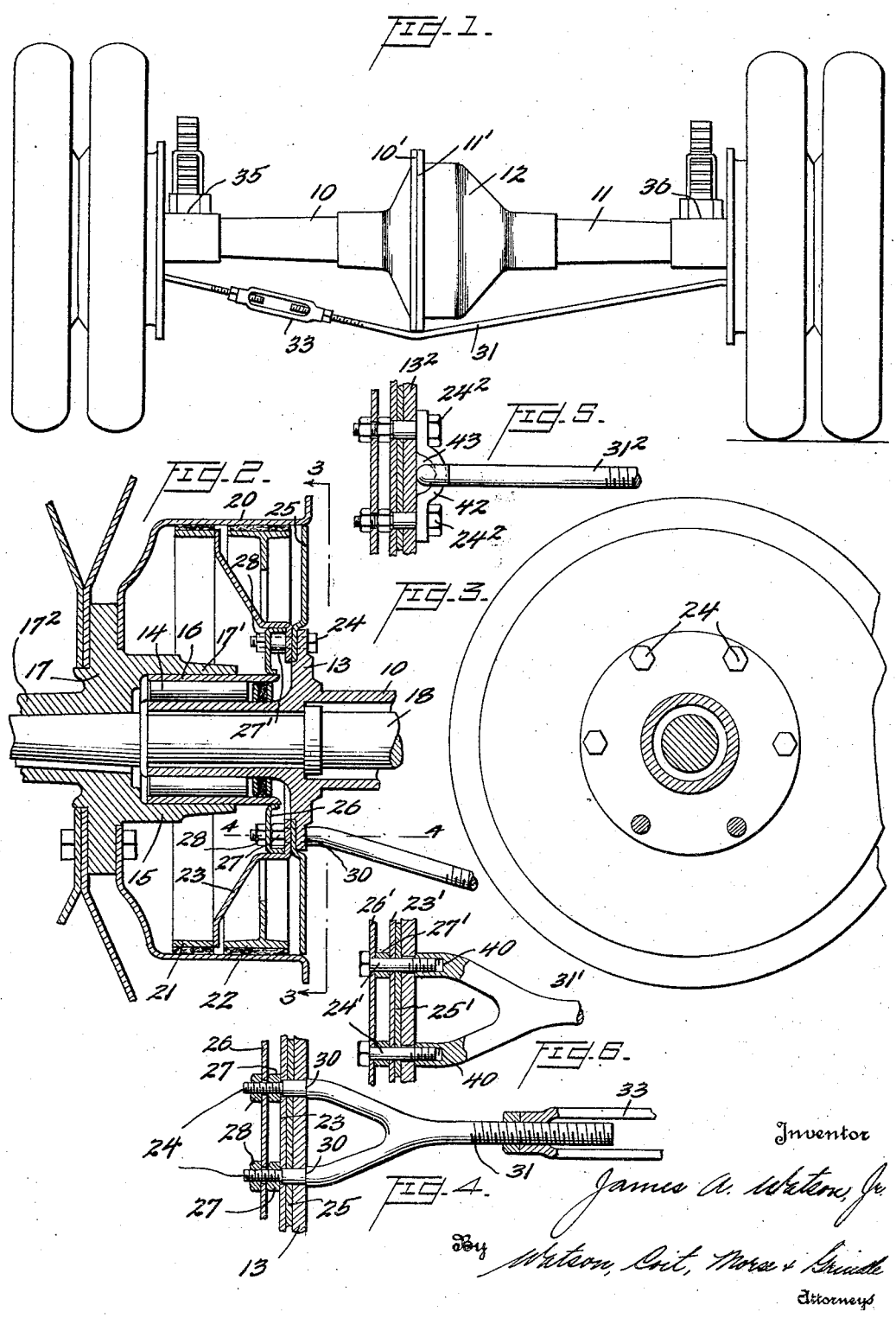

Patented Jan. 3, 1933

1,893,259

UNITED STATES PATENT OFFICE

JAMES A. WATSON, JR., OF SILVER SPRING, MARYLAND

REAR AXLE CONSTRUCTION FOR MOTOR VEHICLES

Application filed December 1, 1931. Serial No. 578,360.

The present invention relates to vehicle rear axle constructions and particularly to rear axle constructions for motor vehicles, such as trucks.

Trucks having bodies of definite sizes and type are primarily designed for the transportation of loads up to certain definite maximum weights. The users of such trucks, however, are not always careful to keep the loads carried thereby, in weight, below the maximum figures established by the manufacturers and are prone to operate them loaded with materials to the limit of capacity of the body, so far as space is concerned, disregarding weight limitations almost entirely.

It is easily possible to thus overload a truck where the material being transported has a relatively large weight per unit of volume. Overloading of any truck in this manner is, of course, injurious and is particularly destructive to the rear axle construction. It will be appreciated that the weight of the body and its contents is transmitted to the rear axle at points between the rear wheels, the rear axle acting as a simple beam receiving load thus transmitted to it and transferring the load to the wheels. The application of excessive loadings to the rear axle tends to deflect the same downwardly and to draw the upper portions of the wheels toward each other. Sometimes an excessive loading of this character produces a serious downward deflection of the rear axle and serious canting of the wheels, and in such instances the differential gearing enclosed within the rear axle housing and the bearings and brake mechanism associated with the wheels are seriously injured.

It has heretofore been suggested that additional strength may be imparted to a rear axle housing by the provision of a tension rod, the ends of which are connected to the axle and the mid-portion of which bears against the under side of the central enlargement of the housing in which the differential mechanism is located. Tension rods of this type no doubt tend to materially strengthen rear axles against downward deflections due to overloading but have not come into any very considerable use because of the difficulties experienced in suitably attaching the ends of these rods to the axle housings themselves.

In accordance with the present invention, however, a novel vehicle rear axle construction embodying a tension rod is provided, the tension rod having its ends secured to the axle housing adjacent the ends thereof by a simple and highly efficient securing means so that the rod may be applied at small expense and in a minimum of time either at the plant of the manufacturer or as an auxiliary appliance added to the vehicle after it has been put into service. The improved tension rod mechanism may even be utilized as a means for correcting the alignment of a housing which has already been seriously deflected by overloading of the truck of which it comprises a part, so that it has a wide field of utility when employed as an accessory to be added to trucks already built and in operation.

In adapting the invention to various types of trucks, the design and arrangement of its component elements may be varied somewhat, as will be apparent. In the accompanying drawing, one well-known type of vehicle rear axle construction embodying the invention is illustrated. It will be appreciated, however, that, by making minor changes in dimension, the invention may be incorporated in axles of other types.

In the drawing:

Figure 1 shows, in rear elevation, a motor vehicle rear axle construction, the improved tension rod being shown in its operative position;

Figure 2 is an axial section through a portion of the end of the axle and wheel hub;

Figure 3 is a section on line 3—3 of Figure 2;

Figure 4 is a section on line 4—4 of Figure 2;

Figure 5 is a view similar to Figure 4 but showing a slightly modified type of construction; and Figure 6 is likewise a section similar to Figure 4 but showing a still further modification.

The rear axle housing of the modern truck is generally formed in two pieces, and this is true of the axle shown in the drawing by way of example, one axle housing section being indicated at 10 and the second at 11, the meeting ends of these housing sections being provided with annular flanges 10' and 11' rigidly secured together by bolts. The axle housing, which is centrally enlarged, as at 12, to provide a chamber for the reception of the differential gearing, is well-known and for that reason not illustrated. The housing sections 10 and 11 are provided adjacent their ends with wheel supporting portions identical in shape and design. One such portion is illustrated in Figure 2. The housing partially illustrated in this figure, which may be the end of the housing portion 10 shown in Figure 1, is provided with an annular flange 13, and beyond this flange the housing is reduced in diameter somewhat to constitute the inner race for the roller bearing 14, which bearing supports the wheel hub 15 in well-known manner. The outer race of the roller bearing 14 is indicated at 16 and is preferably non-rotatably secured to the encircling portion 17' of the wheel hub generally indicated at 17.

The axle shaft is indicated at 18 and is seen to project beyond the end of the housing section 10 and into the sleeve-like portion 17² of hub 17. The end of the axle shaft is keyed to sleeve 17² so that the wheel hub and wheel, or wheels, are driven by the shaft in the usual manner. Fixed on the wheel hub is a dish-shaped member 20, hereinafter designated the drum, the cylindrical inner surface of which is disposed concentrically with respect to the axis of bearing 14 and constitutes a friction surface against which the brake bands 21 and 22 may be urged to retard motion of the vehicle, of which the construction just described comprises a portion.

Brake band 22 is supported on toggle mechanism (not illustrated) connected to the axle housing 10, and the brake band 21 is movably supported upon a brake carrier 23 which is secured by bolts 24 to the periphery of the annular flange 13. Also mounted on these bolts are an annular plate 25, which may be designated the stationary brake housing plate, and an annular ring-like member 26 which serves as a grease baffle to prevent grease from the bearing 14 passing around the outer race 16 of this bearing and into the chamber containing the brake bands. The grease baffle plate has four spacer rings 27' secured thereto, each such ring encircling one of the four uppermost bolts 24. The two lowermost bolts 24 are provided with nuts 27 threaded thereon, which serve not only as spacers but also as retaining nuts for the tension rod, as will be hereinafter more fully explained. Each of the six bolts 24 has a nut 28 threaded upon its outer end, the nuts associated with the two lowermost bolts serving both to retain the grease baffle ring 26 in position and as retaining nuts for the tension rod.

In the construction illustrated, there are six such bolts 24, and, as may be most clearly seen from Figures 2 and 3, the upper four of these bolts are provided with heads at their inner ends while the lower two are not so provided with heads but are simply shouldered as at 30, this shoulder seating against the inner surface of flange 13 and the bolt being continued inwardly beyond the shoulder. In the construction shown in Figure 2, each of the two lower bolts associated with one flange 13 is connected to the corresponding lower bolts at the opposite end of the housing, it being understood that the construction at this opposite end is identical with that actually illustrated in detail, and the connecting means comprises a tension rod indicated at 31. This tension rod is forked at its ends, as most clearly shown in Figure 4, the spaced members comprising each fork being connected to the lower flange bolts, and in the form shown in Figure 4 these members are actually integral with the flange bolts. In other words, the lower flange bolts are formed by properly shaping and threading the extreme ends of the branches on the tension rod.

The tension rod is formed in two portions connected by a turn buckle 33 which has threaded engagement with the adjacent ends of these portions respectively. The threads of the two portions are of opposite "hand" so that, as the turn buckle is rotated in one direction, the two portions of the tension rod are drawn together and the rod shortened and, as it is rotated in the opposite direction, the rod is lengthened. At its mid-portion, the rod passes beneath the enlargement 12 of the housing and in the drawing is shown to make contact with the peripheries of flanges 10' and 11'. Obviously, if rod 31 is placed under tension by manipulation of turn buckle 33, it will exert an upward thrust upon the middle of the housing, or, conversely, if the housing tends to deflect downwardly due to the application of loads, say, for instance, at points 35 and 36, the tension rod will serve as a support preventing material downward movement of the center of the housing.

In the form of the invention shown in Figure 6, the branches of the yoke-shaped ends of the tension rod are interiorly apertured and threaded as at 40, and bolts 24', which are relatively long, are passed through the grease baffle 26', the brake band carrier 23', and the housing plate 25', the threaded ends of these bolts entering the threaded apertures 40 and the tension rod being thereby secured in position.

In the form of the invention illustrated in Figure 5, the bolts 24² secure tightly, against the inner face of the flange 13², a bracket 42 which is provided with a central loop 43. In this case, the tension rod 31² is not bifurcated at the ends but has a hook at each end which passes through the associated loop of the bracket firmly anchored in position by bolts 24². Further modifications might be suggested, and in certain instances the tension rod may be supported at one point only at each end thereof instead of two points, although two such points of support are generally desirable as the tension rod oftentimes is heavily loaded and should be firmly anchored at its ends. By connecting each end of the tension rod to the adjacent flange 13 at two points instead of one, the danger of local overloading of the flange is avoided, even when the tension rod is heavily stressed.

When they come from the factory, trucks having rear axles of the type shown in the drawing are usually not provided with tension rods, and it is frequently necessary to apply such rods after they have been in service for some time. The rod is designed and constructed as illustrated in the drawing, and its application to a truck is a matter involving the expenditure of little time and no implements other than the customary mechanic's tools. Thus, to apply the rod shown in Figures 2 and 4, it is only necessary for the mechanic to remove from the two lower bolt holes in flange 13 the bolts 24 which normally are positioned therein and to thereafter insert in these holes the ends of the forked portions of the tension rod, the nuts shown in Figure 2 being applied as such tension rod ends are inserted, the weak spacer rings 27' being replaced by nuts 27.

This operation may be very easily performed, and the sole additional material which is necessary comprises the tension rod itself with two nuts mounted on each of the four extremities. The turn buckle may then be operated to impart the desired degree of tension to the tension rod, and the installation is then complete.

The means for anchoring the ends of the tension rod to the axle housing flanges illustrated in Figures 5 and 6 is somewhat different from that shown in Figures 2 and 4 and possibily slightly modified additional anchoring means may be provided to suit varying circumstances. It will be appreciated also that the tension rod itself as an article of manufacture may be either completed and installed at the factory at which the truck in its entirety is manufactured or manufactured simply as an accessory and shipped to points where it may be applied.

Having thus described the invention, what is claimed as new and desired to be secured by Letters Patent is:—

1. In a vehicle rear axle construction, in combination, a rear axle housing having its mid-portion enlarged so as to accommodate a differential gearing and provided with annular flanges adjacent its ends, wheels rotatably mounted on the ends of said axle housing beyond said flanges respectively, each such wheel carrying an inwardly extending brake drum, brakes and brake carriers within the drums respectively, and means including a plurality of bolts for securing each brake carrier to the adjacent housing flange, one bolt of each set extending through the associated flange, and a tension rod connecting the inner ends of said two last mentioned bolts and passing beneath and contacting with the bottom of said axle housing enlargement, for the purpose set forth.

2. In a vehicle rear axle construction, in combination, a rear axle housing having its mid-portion enlarged so as to accommodate a differential gearing and provided with annular flanges adjacent its ends, wheels rotatably mounted on the ends of said axle housing beyond said flanges respectively, each such wheel carrying an inwardly extending brake drum, brakes and brake carriers within the drums respectively, and means including a plurality of bolts for securing each brake carrier to the adjacent housing flange, two adjacent bottom bolts of each set extending through the associated flange, and a tension rod connecting the inner ends of the two so extending bolts of one set to the corresponding bolts of the other set, said rod passing beneath and contacting with the bottom of said axle housing enlargement, for the purpose set forth.

3. The combination set forth in claim 2 in which said rod is forked at each end, the terminal ends of the branches comprising the forks being threaded and constituting the bolts interconnected by said rod.

4. The combination set forth in claim 2 in which the inner ends of each pair of bolts extending through the housing flanges, respectively, are connected by a bracket and the mid-points of the brackets are connected by the tension rod.

5. The combination set forth in claim 2 in which the said bolts carry at their outer ends two nuts, one set of such nuts securing the brake carrier to the housing flange, the second set of nuts securing an additional element such as a grease baffle, and both nuts on each of the bolts connected to the tension rod serving to transmit the pull of the tension rod to the associated housing flange.

In testimony whereof I hereunto affix my signature.

JAMES A. WATSON, Jr.